US012619041B2

(12) United States Patent
Lin et al.

(10) Patent No.: US 12,619,041 B2
(45) Date of Patent: May 5, 2026

(54) OPTOELECTRONIC CABLE

(71) Applicant: ELKA INTERNATIONAL LTD., New Taipei City (TW)

(72) Inventors: Kai-Hsuan Lin, New Taipei City (TW); Yi-Chieh Cheng, New Taipei City (TW)

(73) Assignee: ELKA INTERNATIONAL LTD., New Taipei City (TW)

( * ) Notice: Subject to any disclaimer, the term of this patent is extended or adjusted under 35 U.S.C. 154(b) by 328 days.

(21) Appl. No.: 18/105,685

(22) Filed: Feb. 3, 2023

(65) Prior Publication Data

US 2024/0085650 A1     Mar. 14, 2024

(30) Foreign Application Priority Data

Sep. 12, 2022   (TW) ................................. 111209902

(51) Int. Cl.
*G02B 6/44*          (2006.01)
*G02B 6/42*          (2006.01)
(52) U.S. Cl.
CPC ........... *G02B 6/4432* (2013.01); *G02B 6/428* (2013.01)
(58) Field of Classification Search
CPC ......... G02B 6/44; G02B 6/4432; G02B 6/428
See application file for complete search history.

(56) References Cited

U.S. PATENT DOCUMENTS

| | | | | |
|---|---|---|---|---|
| 9,116,322 B1* | 8/2015 | Laws | .................... | G02B 6/4433 |
| 2011/0311191 A1* | 12/2011 | Hayashishita | ......... | G02B 6/446 |
| | | | | 385/101 |
| 2013/0294735 A1* | 11/2013 | Burris | .................. | G02B 6/4471 |
| | | | | 385/101 |
| 2014/0193122 A1* | 7/2014 | Wu | ......................... | G02B 6/428 |
| | | | | 385/101 |
| 2014/0321822 A1* | 10/2014 | Yasuda | ................ | G02B 6/4416 |
| | | | | 385/101 |
| 2018/0224617 A1* | 8/2018 | Lee | .......................... | G02B 6/443 |
| 2018/0268961 A1* | 9/2018 | Kim | ..................... | H01B 7/1895 |
| 2019/0146169 A1* | 5/2019 | Grandidge | ............. | G02B 6/428 |
| | | | | 375/257 |
| 2022/0028579 A1* | 1/2022 | Kobayashi | ........... | H01B 7/0045 |

* cited by examiner

*Primary Examiner* — Tina Wong
(74) *Attorney, Agent, or Firm* — Birch, Stewart, Kolasch & Birch, LLP

(57)                ABSTRACT

An optoelectronic cable comprises an optical fiber wire disposed at the center of the optoelectronic cable, with an armoring layer that is arranged at a periphery of the optical fiber wire. A plurality of electric wires is disposed around the periphery of the optical fiber wire, and an outer sheath is disposed as an outermost layer of the optoelectronic cable. By arranging the armoring layer at the periphery of the innermost optical fiber wire, optical fibers therein can be protected from being damaged by external forces. The overall assembly can also effectively reduce the total diameter, resulting in a softer and more flexible optoelectronic cable highly convenient for packaging and installation.

18 Claims, 4 Drawing Sheets

OPTOELECTRONIC CABLE

FIELD

The present disclosure relates generally to cable manufacturing, and in particular to an optoelectronic cable.

BACKGROUND

With the development of high-speed communication networks, cables are essential for power supply and data transmission of communication network equipment. For example, optoelectronic cables with integrated connectors are used for transmitting power and high-speed signals simultaneously.

Optoelectronic cables combine optical fibers and electric wires. In practice, optoelectronic cables can be a solution for broadband access of high-speed communication network equipment as well as power supply.

In order to improve the mechanical strength of conventional optoelectronic cables, such as increasing tensile strength and compressive strength, improving water resistance, preventing damage from rodent bites, and increasing service lifetime, an armoring layer is used for wrapping around the outer side of the cable for protection. Some optoelectronic cables have armoring layers concentrically arranged on optical fibers in the inner part of the cables. Although the protection effect is adequate, the inner and outer armoring layers will increase the outer diameter of the cables, causing inconvenience in production, packaging, storage and transportation. In addition, such cables are too hard to roll and not soft enough to handle, constituting a major disadvantage when applied to installation and wiring.

Electric wires in optoelectronic cables have already been covered with insulating sheaths, whose material is tough and not easily broken. On the other hand, optical fibers therein are fragile and easily broken, and thus require special protection, so improvements are proposed by further research.

SUMMARY

One aspect of the present disclosure is directed to an optoelectronic cable. The optoelectronic cable comprises a cable body and a connector. The cable body includes: an optical fiber wire disposed at the center of the cable body, a plurality of electric wires disposed around the periphery of the optical fiber wire, and an outer sheath disposed as an outermost layer of the cable body. The optical fiber wire has at least one optical fiber and an armoring layer that is arranged at a periphery of the optical fiber wire. The connector includes a connector body having a front end and a rear end, a plug disposed at the front end of the connector body, a circuit board, and a housing encapsulating the connector body, the circuit board and a front section of the cable body. The circuit board has a front side and a rear side, the front side being coupled to the rear end of the connector body and the rear side coupled to the cable body.

In one aspect, the optical fiber wire includes at least four single-mode or multi-mode optical fibers, and each optical fiber includes a fiber core, a coating layer and a fiber shell.

In one aspect, the optical fiber wire includes four optical fibers each having a diameter of 0.235 mm to 0.265 mm.

In one aspect, the plurality of electric wires includes at least one independent ultra-high-speed signal pair wire set including a pair of transmission wires, a ground wire and a sheath.

In one aspect, each of the pair of transmission wires has a diameter of 0.20 mm to 0.255 mm.

In one aspect, the plurality of electric wires includes at least one first tinned copper stranded wire and at least one second tinned copper stranded wire disposed at intervals around the periphery of the optical fiber wire.

In one aspect, each of the at least one first tinned copper stranded wire has a diameter of 0.405 mm to 0.511 mm.

In one aspect, each of the at least one second tinned copper stranded wire has a diameter of 0.644 mm to 0.812 mm.

In one aspect, the cable body further comprises a plurality of filler wires disposed between and twisted with the plurality of electric wires.

In one aspect, the connector is one of an HDMI connector, a DP connector, a standard USB 2.0 connector, a standard USB 3.0 connector, a standard USB 3.1 connector, a micro USB connector, a USB Power Delivery (USB PD) connector, and a USB Type-C connector.

Compared with conventional structures, by arranging an armoring layer at a periphery of the innermost optical fiber wire, optical fibers therein can be protected from being damaged by external forces, thereby ensuring robust data transmission. The overall assembly can also protect the optical fiber wire while effectively reducing the total diameter, resulting in a softer and more flexible optoelectronic cable highly convenient for packaging and installation.

These and other features, aspects and advantages of various embodiments will become better understood with reference to the following description and appended claims. The accompanying drawings, which are incorporated in and constitute a part of this specification, illustrate embodiments of the present disclosure, and together with the description, serve to explain the related principles.

BRIEF DESCRIPTION OF THE DRAWINGS

The foregoing aspects and many of the attendant advantages of the present disclosure will become more readily appreciated by reference to the following detailed description, when taken in conjunction with the accompanying drawings.

DETAILED DESCRIPTION

Figure 1:
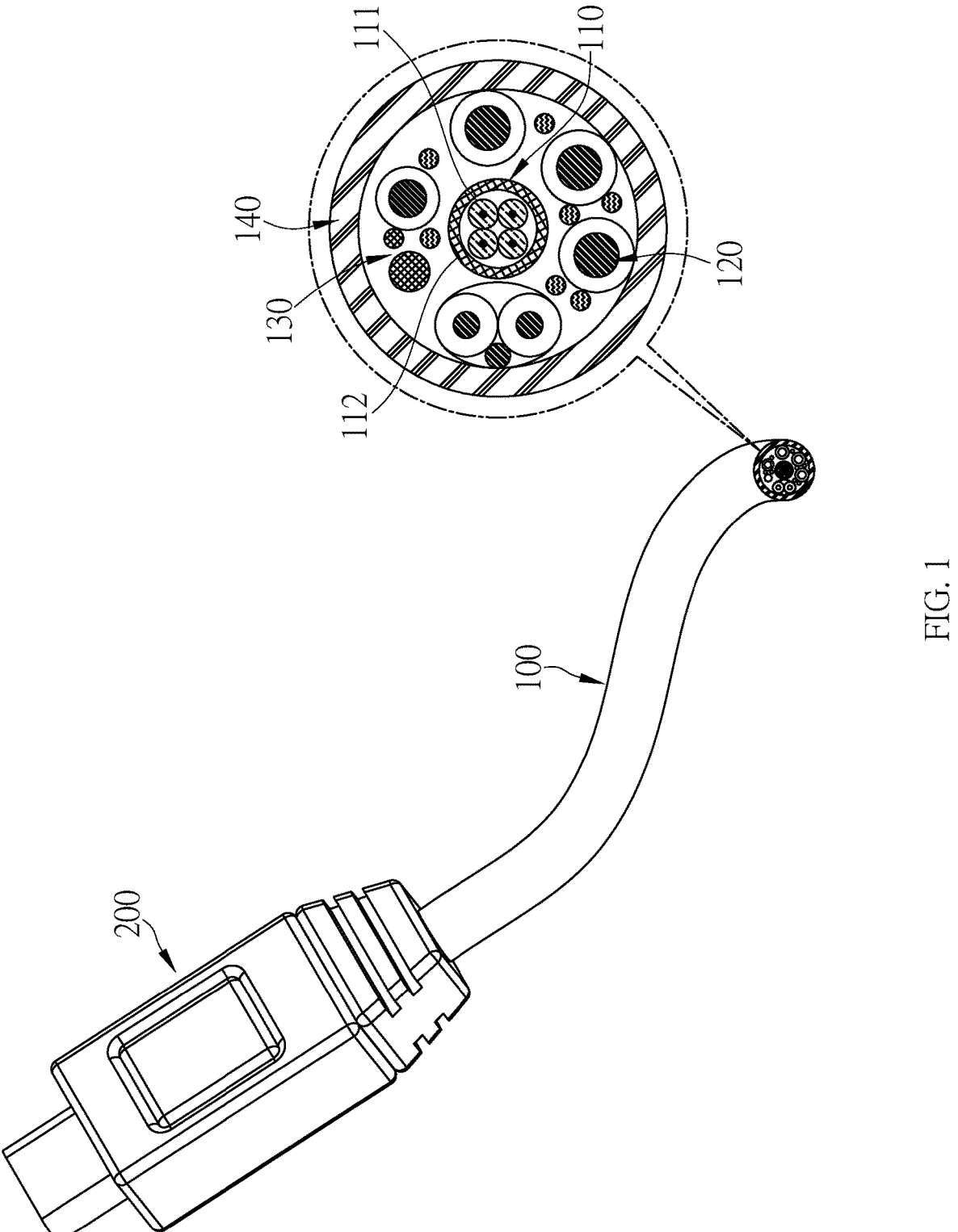
FIG. 1 is a schematic diagram of an optoelectronic cable according to the present disclosure.

Please refer to FIG. 1, which is a schematic diagram of an optoelectronic cable according to the present disclosure. The optoelectronic cable 10 comprises a cable body 100 and a connector 200, where the cable body 100 comprises an optical fiber wire 110, a plurality of electric wires 120, a plurality of filler wires 130 and an outer sheath 140. The optical fiber wire 110 is disposed at the center of the cable body 100, and includes at least one optical fiber 111 and an armoring layer 112 that is arranged at a periphery of the optical fiber wire 110 (e.g., by wrapping the at least one optical fiber 111). The plurality of electric wires 120 is disposed at intervals around the periphery of the optical fiber wire 110, and the plurality of filler wires 130 is disposed between and twisted with the plurality of electric wires 120, such that adequate mechanical protection for the at least one optical fiber 111 is provided by the armoring layer 112 in combination with the plurality of electric wires 120 and the plurality of filler wires 130.

The outer sheath 140 is disposed as an outermost layer of the cable body 100, namely, it wraps the optical fiber wire 110, the plurality of electric wires 120 and the plurality of filler wires 130 from the outside. The outer sheath 140 may be single-layered or multi-layered, and/or may consist of PVC or low smoke zero halogen (LSZH) materials, but its implementation is not limited hereto. The connector 200 will be described in detail with reference to FIGS. 3 and 4.

Figure 2:
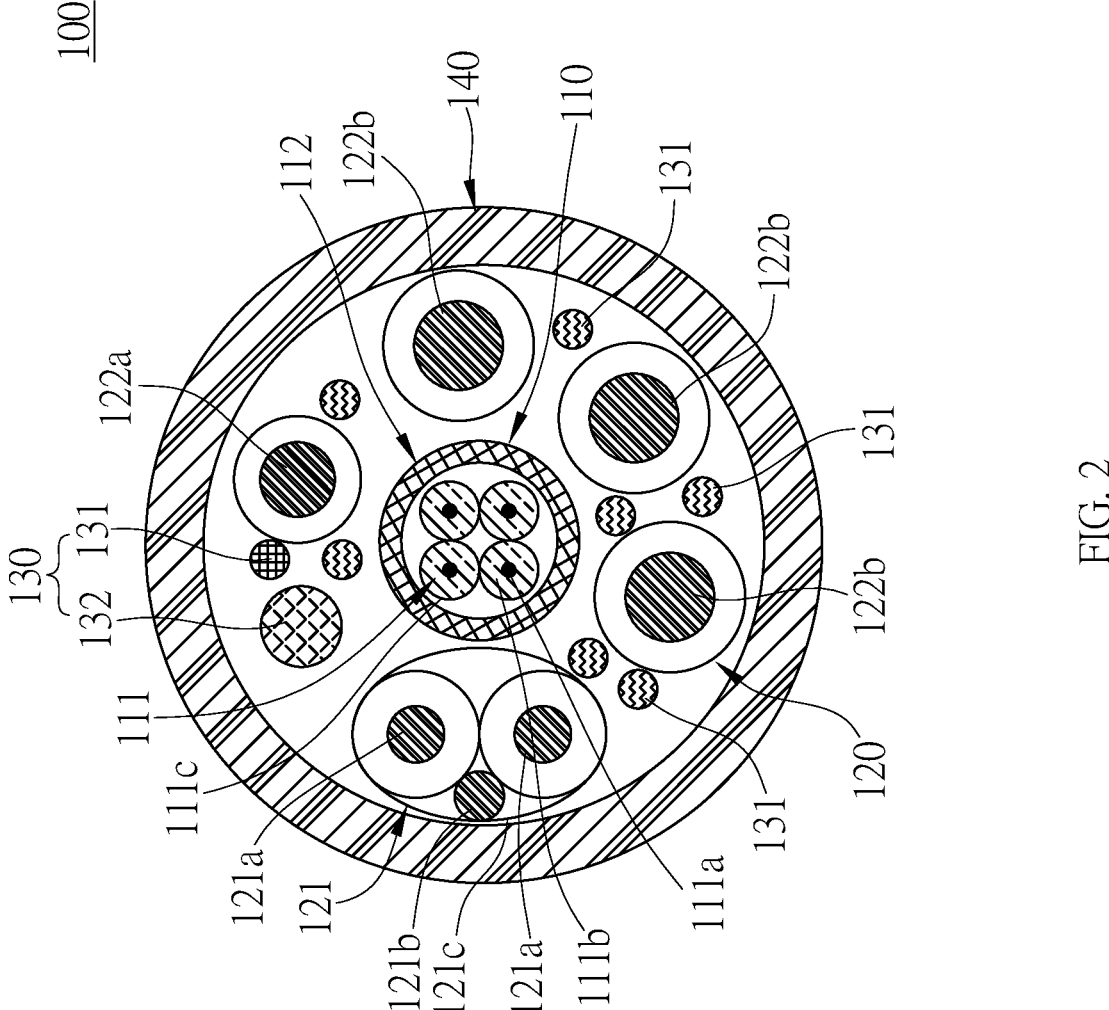
FIG. 2 is a cross-sectional view of a cable body according to the present disclosure.

Now please refer to FIG. 2, which is a cross-sectional view of a cable body according to the present disclosure. As illustrated, the optical fiber wire 110 may include at least four single-mode or multi-mode optical fibers 111, and each optical fiber 111 may include a fiber core 111*a*, a coating layer 111*b* and a fiber shell 111*c*. In one aspect, the optical fiber wire 110 includes four optical fibers 111 each having a diameter of 0.235 mm to 0.265 mm, preferably 0.24 mm.

As illustrated in FIG. 2, the plurality of electric wires 120 may consist of power wires and transmission wires that total 4 to 10, and may include at least one independent ultra-high-speed signal pair wire set 121 including a pair of transmission wires 121*a*, a ground wire 121*b* and a sheath 121*c*. Each of the pair of transmission wires 121*a* may have a diameter of 0.20 mm to 0.255 mm, preferably 0.24 mm. In one aspect, the plurality of electric wires 120 includes at least one first tinned copper stranded wire 122*a* and at least one second tinned copper stranded wire 122*b* disposed at intervals around the periphery of the optical fiber wire 110, wherein each of the at least one first tinned copper stranded wire 122*a* has a diameter of 0.405 mm to 0.511 mm, preferably 0.48 mm, and each of the at least one second tinned copper stranded wire 122*b* has a diameter of 0.644 mm to 0.812 mm, preferably 0.74 mm. Also, the plurality of filler wires 130 may include at least one first filler wire 131 and at least one second filler wire 132 having different diameters. However, it should be noted that the dimensions, quantities and packing manners of the power wires and the transmission wires may be configured as needed, and are not limited hereto.

Figure 3:
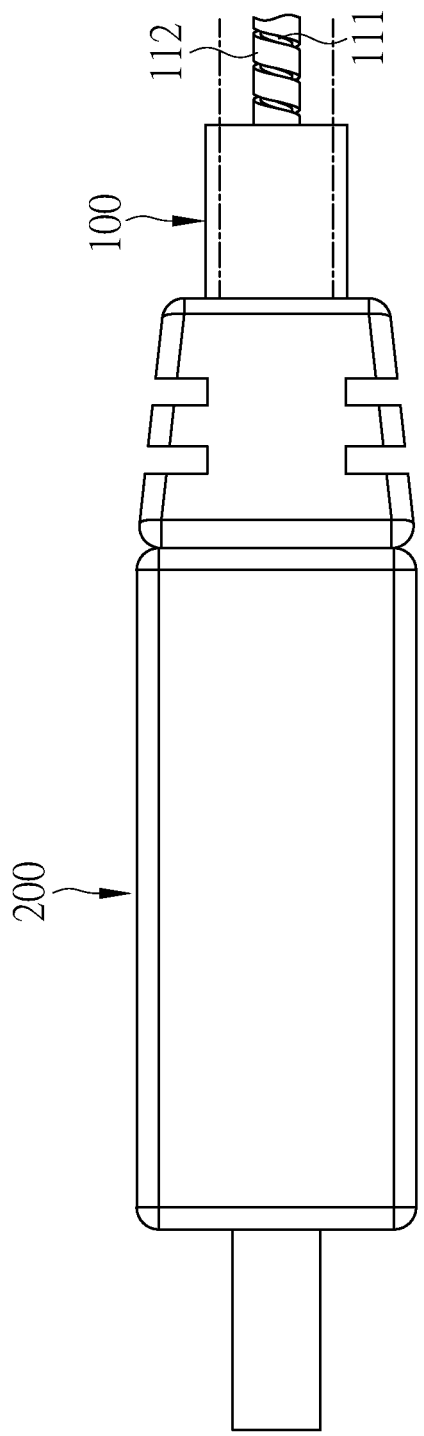
FIG. 3 is a schematic diagram of a connector according to the present disclosure.
Figure 4:
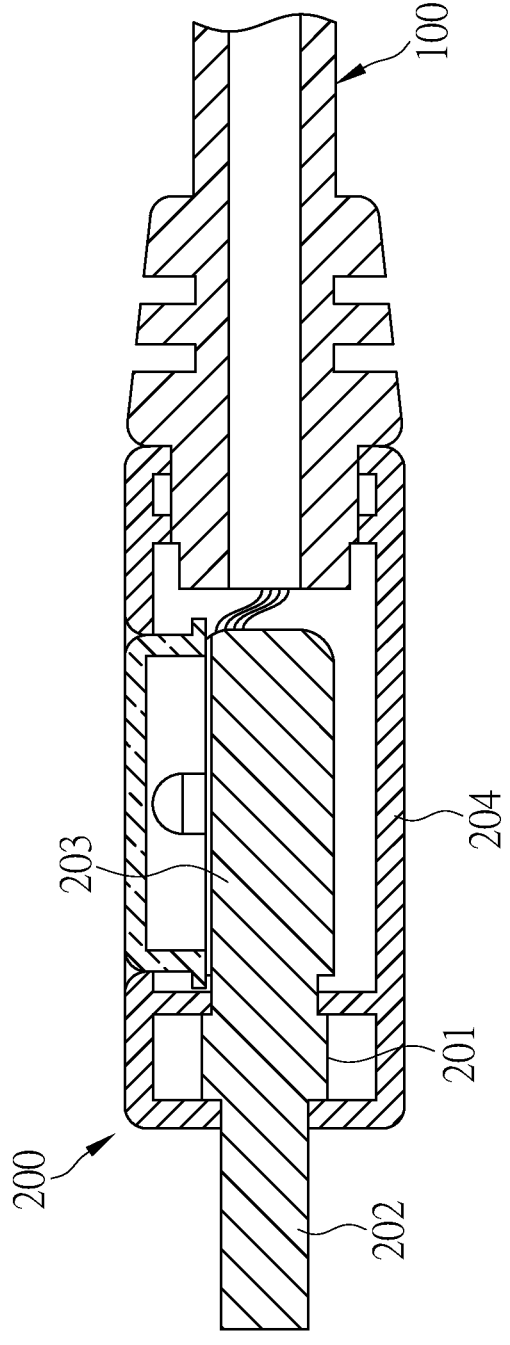
FIG. 4 is a cross-sectional view of the connector according to the present disclosure.

Now please refer to FIGS. 3 and 4, which are respectively a schematic diagram and a cross-sectional view of a connector according to the present disclosure. The connector 200 comprises a connector body 201, a plug 202, a circuit board 203 and a housing 204. The connector body 201 has a front end and a rear end, and the plug 202 is disposed at the front end of the connector body 201. The circuit board 203 has a front side and a rear side, the front side being coupled to the rear end of the connector body 201 and the rear side coupled to the cable body 100. The housing 204 encapsulates the connector body 201, the circuit board 203 and a front section of the cable body 100. In one aspect, the connector 200 is one of an HDMI connector, a DP connector, a standard USB 2.0 connector, a standard USB 3.0 connector, a standard USB 3.1 connector, a micro USB connector, a USB Power Delivery (USB PD) connector, and a USB Type-C connector.

Compared with conventional structures, by arranging the armoring layer 112 at a periphery of the innermost optical fiber wire 110, optical fibers 111 therein can be protected from being damaged by external forces, thereby ensuring robust data transmission. The overall assembly can also protect the optical fiber wire 110 while effectively reducing the total diameter, resulting in a softer and more flexible optoelectronic cable 10 highly convenient for packaging and installation.

Despite being slim and flexible, the optoelectronic cable 10 maintains stable power supply and transmission efficiency, and holds promise for increased transmission bandwidth. Disconnection from destructive forces is prevented, and interference between optical and electrical signals is also avoided, offering a multiple-purpose solution applicable to wiring in various types of networking systems, effectively reducing installation and network construction costs as well as improving system reliability.

Numerous other embodiments, modifications, and/or variations within the scope and spirit of the appended claims can occur to persons of ordinary skill in the art from a review of the present disclosure. Any and all features in the following claims can be combined and/or rearranged in any way possible. Accordingly, the scope of the present disclosure is by way of example rather than by way of limitation, and the subject disclosure does not preclude inclusion of such modifications, variations or additions to the claimed subject matter as would be readily apparent to one of ordinary skill in the art.

What is claimed is:

1. An optoelectronic cable comprising:
   a cable body including:
   an optical fiber wire, the optical fiber wire including at least one optical fiber and an armoring layer that is arranged at a periphery of the optical fiber wire;
   a plurality of electric wires disposed around the periphery of the optical fiber wire;
   a plurality of filler wires disposed between and twisted with the plurality of electric wires, the plurality of filler wires including at least one first filler wire and at least one second filler wire having different diameters; and
   an outer sheath disposed as an outermost layer of the cable body; and
   a connector including:
   a connector body having a front end and a rear end;
   a plug disposed at the front end of the connector body;
   a circuit board having a front side and a rear side, the front side being coupled to the rear end of the connector body and the rear side coupled to the cable body; and
   a housing encapsulating the connector body, the circuit board and a front section of the cable body.

2. The optoelectronic cable of claim 1, wherein the optical fiber wire includes at least four single-mode or multi-mode optical fibers, and each optical fiber includes a fiber core, a coating layer and a fiber shell.

3. The optoelectronic cable of claim 1, wherein the optical fiber wire includes four optical fibers each having a diameter of 0.235 mm to 0.265 mm.

4. The optoelectronic cable of claim 1, wherein the plurality of electric wires includes at least one independent ultra-high-speed signal pair wire set including a pair of transmission wires, a ground wire and a sheath.

5. The optoelectronic cable of claim 4, wherein each of the pair of transmission wires has a diameter of 0.20 mm to 0.255 mm.

6. The optoelectronic cable of claim 1, wherein the plurality of electric wires includes at least one first tinned copper stranded wire and at least one second tinned copper stranded wire disposed at intervals around the periphery of the optical fiber wire.

7. The optoelectronic cable of claim 6, wherein each of the at least one first tinned copper stranded wire has a diameter of 0.405 mm to 0.511 mm.

8. The optoelectronic cable of claim 6, wherein each of the at least one second tinned copper stranded wire has a diameter of 0.644 mm to 0.812 mm.

9. The optoelectronic cable of claim 1, wherein the connector is one of an HDMI connector, a DP connector, a standard USB 2.0 connector, a standard USB 3.0 connector, a standard USB 3.1 connector, a micro USB connector, a USB Power Delivery (USB PD) connector, and a USB Type-C connector.

10. An optoelectronic cable comprising:

an optical fiber wire, the optical fiber wire including at least one optical fiber and an armoring layer wrapping the at least one optical fiber;

a plurality of electric wires disposed around the periphery of the optical fiber wire;

a plurality of filler wires disposed between and twisted with the plurality of electric wires, the plurality of filler wires including at least one first filler wire and at least one second filler wire having different diameters; and an outer sheath wrapping the optical fiber wire and the plurality of electric wires.

11. The optoelectronic cable of claim 10, wherein the optical fiber wire includes at least four single-mode or multi-mode optical fibers, and each optical fiber includes a fiber core, a coating layer and a fiber shell.

12. The optoelectronic cable of claim 10, wherein the optical fiber wire includes four optical fibers each having a diameter of 0.235 mm to 0.265 mm.

13. The optoelectronic cable of claim 10, wherein the plurality of electric wires includes at least one independent ultra-high-speed signal pair wire set including a pair of transmission wires, a ground wire and a sheath.

14. The optoelectronic cable of claim 13, wherein each of the pair of transmission wires has a diameter of 0.20 mm to 0.255 mm.

15. The optoelectronic cable of claim 10, wherein the plurality of electric wires includes at least one first tinned copper stranded wire and at least one second tinned copper stranded wire disposed at intervals around the periphery of the optical fiber wire.

16. The optoelectronic cable of claim 15, wherein each of the at least one first tinned copper stranded wire has a diameter of 0.405 mm to 0.511 mm.

17. The optoelectronic cable of claim 15, wherein each of the at least one second tinned copper stranded wire has a diameter of 0.644 mm to 0.812 mm.

18. The optoelectronic cable of claim 10, further comprising a connector that is one of an HDMI connector, a DP connector, a standard USB 2.0 connector, a standard USB 3.0 connector, a standard USB 3.1 connector, a micro USB connector, a USB Power Delivery (USB PD) connector, and a USB Type-C connector.

* * * * *